(12) United States Patent
Suh et al.

(10) Patent No.: US 7,653,316 B2
(45) Date of Patent: Jan. 26, 2010

(54) DISCRETELY ITU-T CHANNEL GRID WAVELENGTH TUNABLE SINGLE LONGITUDINAL MODE ERBIUM-DOPED FIBER RING LASER

(75) Inventors: Ho Suhng Suh, Daejeon (KR); Han Seb Moon, Chungcheongbuk-do (KR); Won Kyu Lee, Daejeon (KR); Han Young Ryu, Daejeon (KR); Seon Mo Kang, Daejeon (KR)

(73) Assignee: Korea Research Institute of Standard And Science (KR)

( * ) Notice: Subject to any disclaimer, the term of this patent is extended or adjusted under 35 U.S.C. 154(b) by 596 days.

(21) Appl. No.: 11/436,752

(22) Filed: May 18, 2006

(65) Prior Publication Data

US 2006/0216031 A1 Sep. 28, 2006

Related U.S. Application Data

(63) Continuation of application No. PCT/KR2006/000525, filed on Feb. 15, 2006.

(30) Foreign Application Priority Data

Feb. 15, 2005 (KR) ...................... 10-2005-0012167

(51) Int. Cl.
H04B 10/04 (2006.01)

(52) U.S. Cl. ........................... 398/182; 398/79; 398/82; 398/87; 398/183; 398/158; 372/6; 372/18; 372/94; 372/98; 372/70; 356/350; 359/333; 359/337; 359/341.1; 385/24; 385/37

(58) Field of Classification Search ................... 398/79, 398/84, 85, 25, 87, 91, 92, 82, 175, 176, 398/192, 193, 194, 195, 196, 197, 182, 183, 398/157, 158, 152, 160; 372/6, 32, 29.02, 372/94, 98, 20, 70, 18, 10, 102, 106, 22, 372/27; 356/350; 359/333, 341.1, 334, 337; 385/1, 2, 5, 24, 37, 27, 147, 123

See application file for complete search history.

(56) References Cited

U.S. PATENT DOCUMENTS

| 5,504,771 | A | | 4/1996 | Vahala et al. | |
| 6,134,250 | A | * | 10/2000 | Koren et al. | 372/6 |
| 6,606,331 | B2 | | 8/2003 | Sousa et al. | |
| 6,728,274 | B1 | | 4/2004 | Sousa et al. | |
| 2002/0176451 | A1 | * | 11/2002 | Lee et al. | 372/6 |

FOREIGN PATENT DOCUMENTS

| JP | 05-226737 | 9/1993 |
| KR | 10-2005-0025501 | 3/2005 |

OTHER PUBLICATIONS

H. Ryu et al., "A Discretely Tunable Erbium-Doped Fiber Ring Laser with 273 Channel * 50 GHz-Spacing ITU-T grids in C-& L-Band Regions", OFC 2003, 2003, pp. 24-25, vol. 1.

* cited by examiner

Primary Examiner—Hanh Phan

(57) ABSTRACT

Provided is a fiber ring laser capable of obtaining a back-up laser light and standard light having a wavelength continuously tuned in a single mode with equal spacing of 12.5 GHz, 25 GHz, 50 GHz or 100 GHz recommended by ITU-T Recommendation G. 692 & G. 694.1 in a C-band and an L-band using a fiber tunable etalon filter, an air gap etalon filter and a saturable absorber in an optical fiber laser resonator having a serial ring shape using a C-band optical amplifier and an L-band optical amplifier. The fiber ring laser can generate laser light having a wavelength tuned by more than 70 nm, excellent output power flatness and a source spontaneous emission ratio of more than 70 dB in 361 channels with equal spacing of 25 GHz by applying a bias voltage to a voltage-operated piezoelectric element of a tunable etalon filter. A single longitudinal mode operation of the fiber ring laser can be obtained by using a saturable absorber serving as a narrow-bandwidth filter.

6 Claims, 6 Drawing Sheets

DISCRETELY ITU-T CHANNEL GRID WAVELENGTH TUNABLE SINGLE LONGITUDINAL MODE ERBIUM-DOPED FIBER RING LASER

CROSS-REFERENCE TO RELATED APPLICATIONS

The present application is a continuation of pending International patent application PCT/KR2006/000525 filed on Feb. 15, 2006 which designates the United States and claims priority from Korean patent application No. 2005-12167 filed on Feb. 15, 2005, the content of which is incorporated herein by reference.

FIELD OF THE INVENTION

The present invention relates to a discretely ITU-T channel grid wavelength tunable single longitudinal mode erbium-doped fiber ring laser. More specifically, the invention relates to an optical fiber laser capable of obtaining a back-up laser light and standard light having a wavelength continuously tuned with equal spacing of 25 GHz recommended by ITU-T Recommendation G. 692 & G. 694.1 in a conventional/long wavelength band (C/L-band) using a fiber tunable etalon filter, an air gap etalon filter and a saturable absorber in an optical fiber laser resonator.

BACKGROUND OF THE INVENTION

Lights having different wavelengths are propagated without interfering with each other. Thus, when signals are loaded in different wavelengths and transmitted through a single optical fiber, they are transferred through the optical fiber without interfering with each other. This transmission method is called wavelength division multiplexing (WDM). Information transmission capacity of optical fibers can be remarkably increased when the wavelength division multiplexing is used.

A dense wavelength division multiplexing technique is expected to be widely used in optical telecommunications for the purpose of commercial services. However, the dense wavelength division multiplexing technique increases the number of channels to thereby result in a formation of a network having a complicated structure. Furthermore, a light source having a stabilized wavelength recommended by ITU-T is required in order to design and operate a more flexible network.

Accordingly, International telecommunications Union (ITU) recommends the utilization of a light source having a channel frequency with equal spacing of 12.5 GHz, 25 GHz, 50 GHz or 100 GHz adjacent to 193.1 THz in order to use the dense wavelength division multiplexing. Recently, a variety of wavelength tunable lasers including a vertical cavity surface emitting lasers, an external cavity laser diode, a distributed feedback laser diode and a distributed Bragg reflector laser diode have been commercially developed and used in dense wavelength division multiplexing systems.

A wavelength tunable laser and a fiber laser should be designed such that their operating wavelengths correspond to a wavelength (frequency) recommended by ITU-T. The wavelength tunable laser and fiber laser are widely used as a light source in wavelength division multiplexing optical communication systems to effectively maintain the dense wavelength division multiplexing systems at a low cost.

An optical fiber laser developed as an application light source for testing elements at a high speed is attractive more than a semiconductor laser when applied to the dense wavelength division multiplexing systems because the optical fiber laser has a wide wavelength tunable range having excellent wavelength selectivity through a short wavelength band (S-band) of 1460 through 1530nm, a conventional band (C-band) and a long wave band (L-band) of 1530 through 1625 nm and a single mode operation.

TABLE 1

| Author | Tuning Mechanism | Tuning Range | Laser Linewidth | ITU grid Channels | Papers |
|---|---|---|---|---|---|
| M. Horowitz | intracavity | a few nm (C-band) | ~kHz | ◈ | Electronics Letters (1994) |
| Y. Cheng | FBG | a few nm (C-band) | 0.95 kHz | ◈ | Optics Letters (1995) |
| Y. Song | FBG | 40 nm (C-band) | 1 kHz | ◈ | PTL (2001) |
| N. J. C. Libatique | FBG, etalon filter | 50 GHz (8 Ch.) (C-band) | 10 KHz | ○ | Optics Express (2002) |
| H. Chen | TBF | 70 nm (C + L-band) | ~kHz | ◈ | PTL (2003) |
| F. Farokhrooz | Sagnac loop filters | 32 nm (C-band) | 40 kHz | ◈ | OFC (2004) |

Table 1 represents examples of fiber ring lasers using a saturable absorber, which have been studied and developed. All these fiber ring lasers are operated in a single mode. However, the fiber ring lasers restrict wavelength tunable ranges or do not operate to have a frequency separation recommended by ITU-T.

SUMMARY OF THE INVENTION

Accordingly, the present invention has been made to solve the above problems occurring in the prior art, and it is an object of the present invention is to provide an optical fiber laser capable of obtaining a back-up laser light and standard light having a wavelength continuously tuned in a single mode having a wavelength tunable range of more than 70 nm with equal spacing of 12.5 GHz, 25 GHz, 50 GHz or 100 GHz recommended by ITU-T Recommendation G. 692 & G. 694.1 in a C-band (1530 nm<1565 nm) and an L-band (1565 nm<1625 nm) using a fiber tunable etalon filter and an air gap etalon filter in an optical fiber laser resonator having a serial ring shape using a C-band optical amplifier and an L-band optical amplifier.

Another object of the present invention is to provide a fiber ring laser having a wavelength continuously tuned with equal spacing in a single longitudinal mode, which improves mode stability by using a saturable absorber included in an optical fiber laser resonator having two types of etalon filters.

Still another object of the present invention is to provide a fiber ring laser whose wavelength is continuously tunable with equal spacing of 12.5 GHz, 25 GHz, 50 GHz or 100 GHz, which has accuracy of frequency separation recommended by ITU-T, flatness of output power, rapid wavelength tuning, a high optical signal to noise ratio and a wide wavelength tunable range.

To accomplish the above object, according to the present invention, there is provided a discretely ITU-T channel grid wavelength tunable single longitudinal mode erbium-doped fiber ring laser, which is fabricated to discretely tune a channel wavelength satisfying ITU-T grid channel value of 193.1 THz±n*12.5 GHz (n is an integer) specified by ITU-T Recommendation G.692 and G694.1 in a C-band and an L-band in a discrete wavelength tunable single longitudinal mode ring type optical fiber structure, wherein first and second erbium-doped optical fibers that are saturable absorbers having first and second optical fiber amplification stages having a unidirectional structure, an air gap etalon filter (or solid Fabry-Perot etalon filter having dynamic characteristic) having an air gap (or special gas gap or vacuum gap), a fiber wavelength tunable etalon filter, and a saturable absorber composed of an erbium-doped optical fiber are serially connected one another such that they can be simultaneously used.

The optical fiber amplification stages have a two-stage serial structure and respectively amplify C-band optical signals and L-band optical signals using a L/C directional coupler.

The saturable absorber is an absorber filter spliced with a single-mode erbium-doped optical fiber one end of which is coated with a metal or a dielectric such that an input light has maximum reflectivity and connected to an optical circulator such that the absorber filter has characteristic of an optical filter.

The air gap etalon filter includes a thermal electric cooler and a temperature controller for controlling and stabilizing temperature such that a resonant frequency in response to a length variation has a frequency separation of 193.1 THz± (n*12.5, n*25, n*50 or n*100, n is an integer) recommended by Recommendation G.692 and G.694 relative to ITU-T grid space.

The fiber wavelength tunable etalon filter is a wavelength tunable filter including a widely wavelength tunable Fabry-Perot filter having a narrow transmission linewidth, a fiber Bragg grating filter or a grating type filer.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Reference will now be made in detail to the preferred embodiment of the present invention with reference to the attached drawings.

Figure 1:
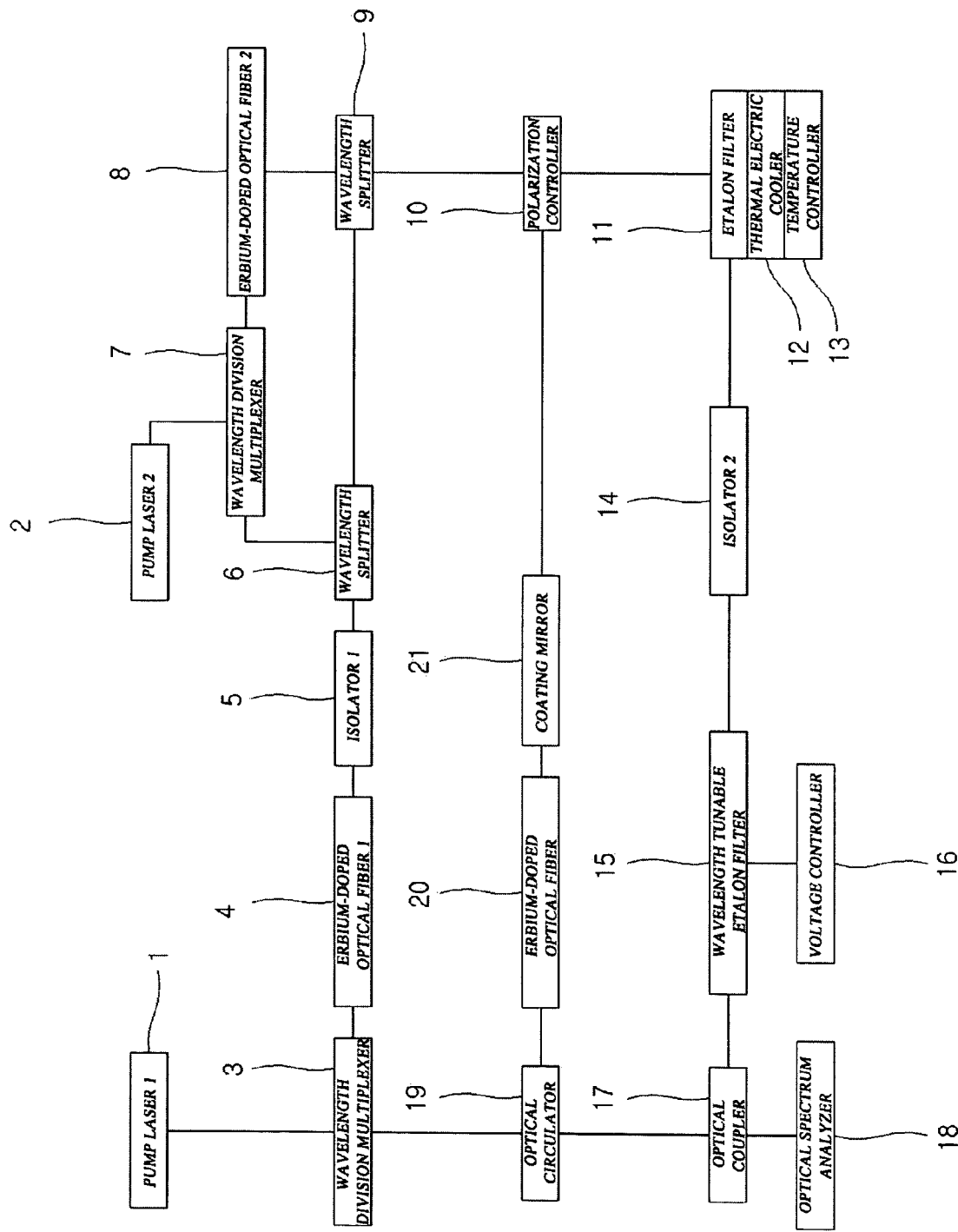
FIG. 1 is a block diagram of a fiber ring laser in which 361 channels are continuously wavelength-tuned with equal spacing of 25 GHz according to the present invention.

FIG. 1 is a block diagram of a fiber ring laser in which 361 channels are continuously wavelength-tuned with equal spacing of 25 GHz according to the present invention. In the fiber ring laser, pumping optical signals of high power pumping laser diodes 1 and 2 with a wavelength of 980 nm, input optical signals having a C-band wavelength of 1530 to 1565 nm and an L-band wavelength of 1565 to 1625 nm, optically fed back from a fiber wavelength tunable etalon filter 15, and an input optical signal having an L-band wavelength, split by a wavelength splitter 6, are multiplexed by a wavelength division multiplexer 3 and a wavelength division multiplexer 7, inputted to a 5.4 m erbium-doped optical fiber 4 and a 30 m erbium-doped optical fiber 8, and amplified.

Here, the erbium-doped optical fibers 4 and 8 are obtained by doping Er3+ ion into silica optical fiber. The erbium-doped optical fiber 4 amplifies optical signals having a wavelength of a C-band and an L-band wavelengths among optical signals having L/C-band wavelengths selected by the fiber wavelength tunable etalon filter 15 and the wavelength splitter 6 propagates an L-band optical signal to the erbium-doped optical fiber 8. The erbium-doped optical fiber 8 amplifies the L-band optical signal split by the wavelength splitter 6.

An air gap etalon filter 11 is located on a path through which a C-band optical signal split by the wavelength splitter 6 composed of an L/C coupler and the L-band optical signal amplified by the erbium-doped optical fiber 8 are combined by a wavelength splitter 9 composed of an L/C coupler and propagated, that is, before the fiber wavelength tunable etalon filter 15. The air gap etalon filter 11 continuously selects an optical signal wavelength having spacing of 25 GHz while the fiber wavelength tunable etalon filter 15 varies the frequency of the L/C-band optical signals output from the wavelength splitter 9.

A polarization controller 10 located between the wavelength splitter 9 and the air gap etalon filter 11 controls polarization of a laser beam, caused by a change in the condition of bending or twisting an optical fiber in a manufacturing process. The air gap etalon filter 11 is an air gap Fabry-Perot interferometer using air, special gas or vacuum.

An isolator 5 is placed before the erbium-doped optical fiber 4 to prevent noises caused by spontaneous emission of light generated when the 980 nm pumping laser is applied to the erbium-doped optical fiber 8 from being inputted to the erbium-doped optical fiber 4. An isolator 14 is located before the air gap etalon filter 11 to restrict the formation of an undesirable resonator due to reflection from the fiber wavelength tunable etalon filter 15.

The air gap etalon filter 11 having fineness of approximately 75 is an air gap Fabry-Perot interferometer packaged with ultra low expansion or zerodour etalon. The air gap etalon filter 11 has low loss, output flatness and a wide operating range of 1.5 to 1.6 μm because its insertion loss is less than 3 dB and its free spectral range is fixed to 25 GHz according to accurate spacing control of etalon.

The fiber wavelength tunable etalon filter 15 is a wavelength tunable filter including a widely wavelength tunable Fabry-Perot filter with a narrow transmission linewidth, a fiber Bragg grating filter or a grating filter. The fiber wavelength tunable etalon filter 15 has an insertion loss of 3 dB, free spectral range of 11.8 THz and full width half maximum of 10 GHz.

The air gap etalon filter 11 includes a thermal electric cooler 12 and a temperature controller 13 for controlling and stabilizing temperature such that a resonant frequency in response to a length variation has a frequency separation of 193.1 THz±(n*12.5, n*25, n*50 or n*100, n is an integer) recommended by Recommendation G.692 and G.694.1 relative to ITU-T channel grid separation, to control a wavelength variation due to external environments.

The center wavelength of the fiber wavelength tunable etalon filter 15 controls the voltage of a voltage-operated piezoelectric element by a voltage controller 16 within the gain bandwidths of the erbium-doped optical fibers 4 and 8 to discretely tune the wavelength of finally output laser light.

The laser light output from the fiber wavelength tunable etalon filter 15 is split in the ratio of 70 to 30 by a photocoupler 17, inputted to the erbium-doped optical fiber 4 as an input optical signal through a circulator 19 and, simultaneously, output to an output terminal, that is, an optical spectrum analyzer 18 such that characteristic of the laser light is monitored or the laser light is used as an output laser beam.

The circulator 19 prevents unstable lasing caused by reverse reflection of a spontaneous emission signal, generated by the erbium-doped optical fiber 4 and reversely amplified, to the fiber wavelength tunable etalon filter 15. One of three ports of the circulator 19 is connected to an erbium-doped optical fiber 20 that is a saturable absorber having a length of 0.6 m and a coating mirror 21. Here, the saturable absorber, that is, the unpumped erbium-doped optical fiber 20, forms a standing wave pattern by an optical signal inputted thereto and a signal reflected by the coating mirror 21. That is, spatial hole burning effect is induced due to interference of the standing wave pattern and an absorption grating is formed according to a periodic refractive index variation so that the erbium-doped optical fiber 20 serves as a filter with a narrow bandwidth.

Figure 2:
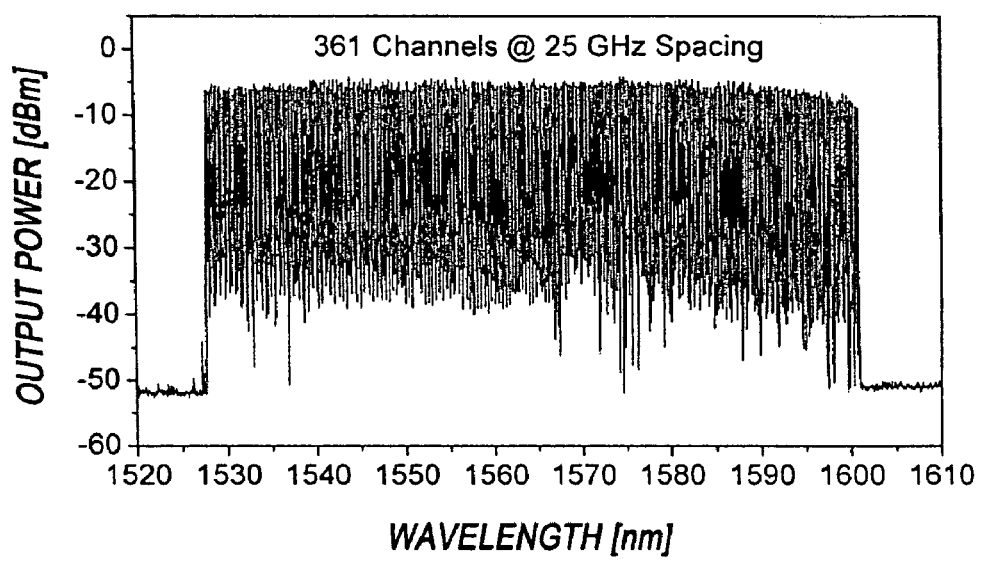
FIG. 2 shows an output power spectrum of the fiber ring laser according to the present invention, which shows all of oscillatable spectra of 361 channels discretely wavelength-tuned with spacing of 25 GHz in a width of approximately 73 nm from 1527.4 nm to 1600.8 m.

FIG. 2 shows an output power spectrum of the fiber ring laser according to the present invention, which shows that the wavelength of laser light is tuned such that 361 channels can be obtained with 25 GHz spacing between 1527.4 through 1600.8 nm when a voltage controlled by the voltage controller 16 is applied to a voltage-operated piezoelectric element of the fiber wavelength tunable etalon filter 15.

Figure 3:
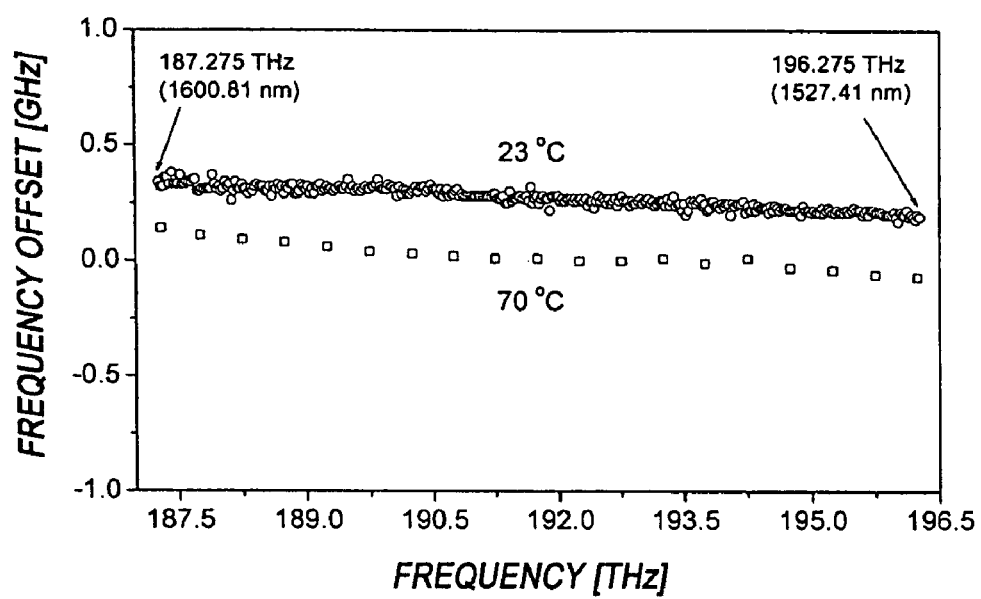
FIG. 3 shows a frequency offset corresponding to a frequency difference of the oscillating laser in ITU-T channel grid value of the fiber ring laser according to the present invention, in which 23° C. and 70° C. represent temperature values of an etalon filter 11 of FIG. 1.

FIG. 3 shows a frequency offset corresponding to a frequency difference of lasers actually operated from ITU-T channel grid value with respect to the entire output power spectrum of the fiber ring laser. A frequency offset difference, that is, a difference between maximum and minimum values, for the entire output power is lower than 0.36 GHz. To reduce the frequency offset, the frequency offset value for the entire output power can be decreased within ±0.14 GHz when the temperatures of the temperature controller 13 and thermal electric cooler 12 are increased to 70° C.

Figure 4:
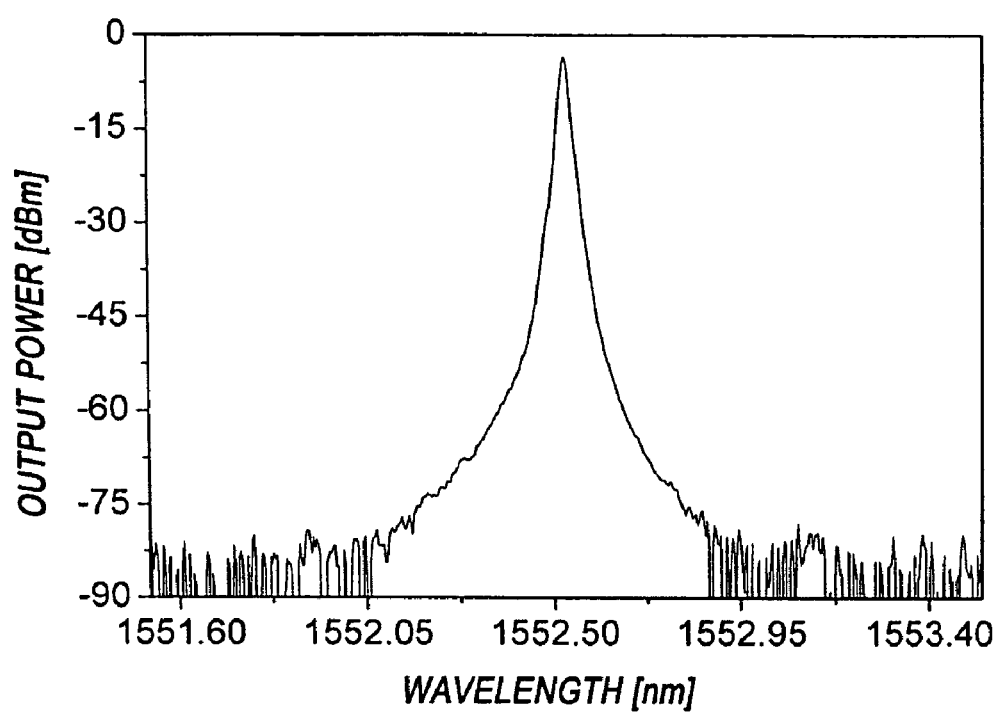
FIG. 4 shows an optical output power spectrum of a channel oscillating in the fiber ring laser according to the present invention.

FIG. 4 shows a laser output power spectrum of a channel of the fiber ring laser. Referring to FIG. 4, a spontaneous emission signal to noise ratio is larger than 70 dB/nm and, at this time, the output power is approximately 0.5 mW.

Figure 5:
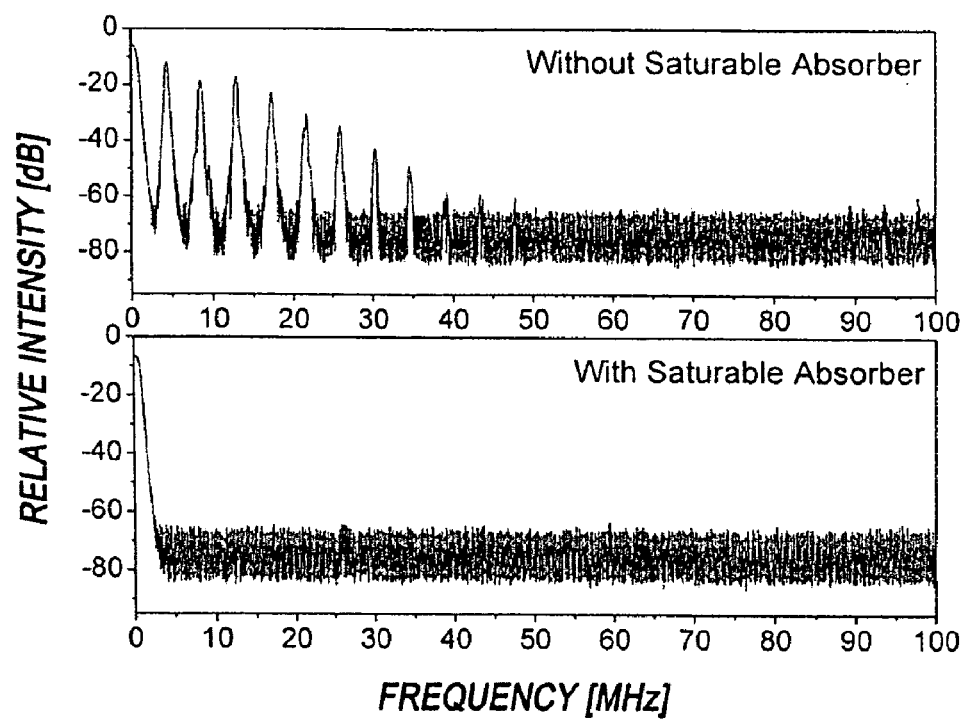
FIG. 5 shows output power spectrum characteristics of an RF frequency, displayed on an electronic spectrum analyzer, when the fiber ring laser according to the present invention includes a saturable absorber and when the fiber ring laser does not include the saturable absorber.

FIG. 5 shows RF output power spectra when the fiber laser resonator includes the erbium-doped optical fiber 20 that is a saturable absorber and when the fiber laser resonator does not include the saturable absorber. Referring to FIG. 5, the fiber ring laser is operated in a multi-mode when there is no erbium-doped optical fiber 20. The fiber ring laser is operated in a single longitudinal mode when the erbium-doped optical fiber 20 is included in the fiber laser resonator because there is no interference between longitudinal modes.

In FIG. 5, harmonics of 4.5 MHz corresponding to spacing between longitudinal modes appear when there is no erbium-doped optical fiber 20. When the erbium-doped optical fiber 20 is used so that the fiber ring laser is oscillated in a single longitudinal mode, harmonics according to longitudinal mode spacing of 4.5 MHz does not appear. That is, FIG. 5 shows that the fiber ring laser is oscillated in a single longitudinal mode when the saturable absorber is used.

Figure 6:
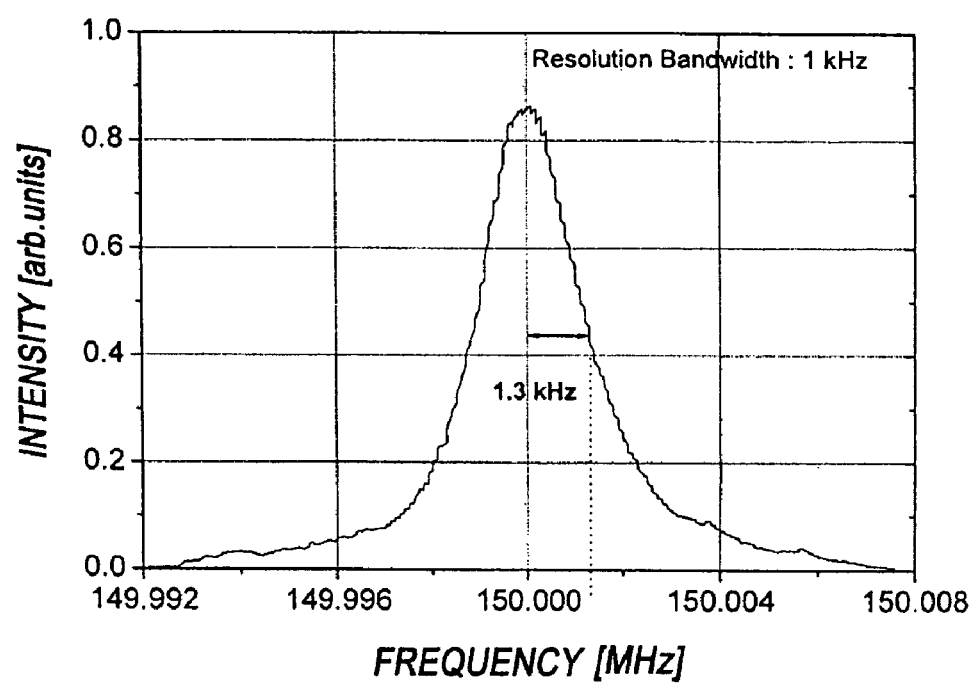
FIG. 6 shows a result obtained by measuring a laser spectrum linewidth in a single channel oscillating in the fiber ring laser according to the present invention using a time delay self heterodyne beat measurement method, in which the linewidth has full width half maximum of 1.3 KHz.

FIG. 6 shows an oscillating spectrum linewidth of the fiber ring laser according to the present invention. The oscillating spectrum linewidth of the fiber ring laser corresponds to full width half maximum of 1.3 KHz. Here, the oscillating spectrum linewidth is measured using a time delay self heterodyne beam measurement method with 25 Km Mach Zender interferometer set on one arm.

As described above, the present invention can process the wavelength of laser light to correspond to a channel wavelength value having equal spacing recommended by ITU-T to obtain a wavelength tunable back-up laser, which can serve as 361 semiconductor lasers for telecommunications in a dense wavelength division telecommunication system. Furthermore, the equal-spacing wavelength of laser light of a fiber laser resonator has a uniform frequency separation, and thus the present invention can use the laser light as a frequency reference light.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A discretely ITU-T channel grid wavelength tunable single longitudinal mode erbium-doped fiber ring laser, fabricated to discretely tune a channel wavelength satisfying ITU-T grid channel value of 193.1 THz ±n*12.5 GHz (n is an integer) specified by ITU-T Recommendation G.692 and G694.1 in a C-band and an L-band in a discrete wavelength tunable single longitudinal mode ring type optical fiber structure, comprising:

first and second erbium-doped optical fibers that are saturable absorbers having first and second optical fiber amplification stages having a unidirectional structure, an air gap etalon filter having an air gap, a fiber wavelength tunable etalon filter, and a saturable absorber composed of an erbium-doped optical fiber are serially connected with one another such that they can be simultaneously used.

2. The discretely ITU-T channel grid wavelength tunable single longitudinal mode erbium-doped fiber ring laser as claimed in claim 1, wherein the optical fiber amplification stages have a two-stage serial structure and respectively amplify C-band optical signals and L-band optical signals using a L/C directional coupler.

3. The discretely ITU-T channel grid wavelength tunable single longitudinal mode erbium-doped fiber ring laser as claimed in claim 1, wherein the saturable absorber is an absorber filter spliced with a single-mode erbium-doped optical fiber one end of which is coated with a metal or a dielectric such that an input light has maximum reflectivity and connected to an optical circulator such that the absorber filter has a characteristic of an optical filter.

4. The discretely ITU-T channel grid wavelength tunable single longitudinal mode erbium-doped fiber ring laser as claimed in claim 1, wherein the air gap etalon filter includes a thermal electric cooler and a temperature controller for controlling and stabilizing temperature such that a resonant frequency in response to a length variation has a frequency separation of 193.1 THz $\pm$(n* 12.5, n*25, n*50 or n*100, n is an integer) recommended by Recommendation G.692 and G.694 relative to ITU-T grid space.

5. The discretely ITU-T channel grid wavelength tunable single longitudinal mode erbium-doped fiber ring laser as claimed in claim 1, wherein the fiber wavelength tunable etalon filter is a wavelength tunable filter including a widely wavelength tunable Fabry-Perot filter having a narrow transmission linewidth, a fiber Bragg grating filter or a grating type filer.

6. The discretely ITU-T channel grid wavelength tunable single longitudinal mode erbium-doped fiber ring laser as claimed in claim 1, further comprising:
   a first pumping laser diode optically coupled to the first erbium-doped optical fiber; and
   a second pumping laser diode optically coupled to the second erbium-doped optical fiber.

* * * * *